(12) United States Patent
Kittleson et al.

(10) Patent No.: US 10,533,432 B2
(45) Date of Patent: Jan. 14, 2020

(54) PREFORM CMC ARTICLE, CMC ARTICLE, AND METHOD FOR FORMING CMC ARTICLE

(71) Applicant: GENERAL ELECTRIC COMPANY, Schenectady, NY (US)

(72) Inventors: Jacob John Kittleson, Greenville, SC (US); James Murray, Piedmont, SC (US); Gregory Scot Corman, Ballston Lake, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 121 days.

(21) Appl. No.: 15/421,882

(22) Filed: Feb. 1, 2017

(65) Prior Publication Data
US 2018/0216477 A1 Aug. 2, 2018

(51) Int. Cl.
*B32B 5/26* (2006.01)
*F01D 5/28* (2006.01)

(52) U.S. Cl.
CPC ............ *F01D 5/284* (2013.01); *B32B 5/26* (2013.01); *B32B 2250/02* (2013.01);
(Continued)

(58) Field of Classification Search
CPC ............ B32B 2250/02; B32B 2250/20; B32B 2260/023; B32B 2260/04; B32B 2262/105; B32B 2262/106; B32B 2603/00; B32B 5/26; F01D 5/284; F05D 2230/31; F05D 2300/6033
See application file for complete search history.

(56) References Cited

U.S. PATENT DOCUMENTS 6,759,117 B2 * 7/2004 Bauer .................. C04B 35/571
156/182
2004/0191411 A1 9/2004 Hornor et al.
(Continued)

OTHER PUBLICATIONS

Dr. D. Kopeliovich, "Fabrication of Ceramic Matrix Composites by Liquid Silicon Infiltration (LSI)", SubsTech Substances & Technologies, http://www.substech.com/dokuwiki/doku.php?id=fabrication_of_ceramic_matrix_composites_by_liquid_silicon_intiltration_lsi, Jun. 2, 2012.

*Primary Examiner* — Lawrence D Ferguson
(74) *Attorney, Agent, or Firm* — McNees Wallace & Nurick LLC

(57) ABSTRACT

A preform CMC article is disclosed comprising an interior ply structure having at least one interior CMC ply including at least one longitudinal CMC ply disposed along the article length, an exterior shell ply forming an article surface and having at least one exterior CMC ply substantially surrounding the interior ply structure, and at least one wicking portion in which the interior ply structure penetrates the exterior ply shell with an exposed edge of the longitudinal CMC ply disposed at the article surface. A CMC article is disclosed including the interior ply structure and the exterior ply shell, wherein the longitudinal CMC ply includes an exposed edge disposed at the surface of the CMC article. A method for forming the CMC article is disclosed including wicking a melt infiltration agent into the article through the wicking portion into the interior ply structure along the longitudinal CMC ply.

20 Claims, 1 Drawing Sheet

(52) U.S. Cl.
CPC ..... *B32B 2250/20* (2013.01); *B32B 2260/023* (2013.01); *B32B 2260/04* (2013.01); *B32B 2262/105* (2013.01); *B32B 2262/106* (2013.01); *B32B 2603/00* (2013.01); *F05D 2300/6033* (2013.01)

(56) References Cited

U.S. PATENT DOCUMENTS

2013/0084189 A1* 4/2013 Diego .................. C04B 37/001
 416/241 B
2016/0326064 A1 11/2016 Shim et al.

\* cited by examiner

PREFORM CMC ARTICLE, CMC ARTICLE, AND METHOD FOR FORMING CMC ARTICLE

FIELD OF THE INVENTION

The present invention is directed to preform ceramic matrix composite ("CMC") articles, CMC articles, and methods for forming CMC articles. More particularly, the present invention is directed to preform CMC articles, CMC articles, and methods for forming CMC articles including an exposed edge of at least one longitudinal CMC ply.

BACKGROUND OF THE INVENTION

Gas turbines are continuously being modified to provide increased efficiency and performance. These modifications include the ability to operate at higher temperatures and under harsher conditions, which often requires material modifications and/or coatings to protect components from such temperatures and conditions. As more modifications are introduced, additional challenges are realized.

One modification to increase performance and efficiency involves forming gas turbine components, such as, but not limited to, airfoils, buckets (blades), nozzles (vanes), shrouds, combustor liners, and heat shields from CMC. However, CMC components, particularly those CMC components which include thick solid sections, may be slow or difficult to densify due to trans-laminar melt infiltration rates across plies, which may give rise to undesirably lengthy densification processes. Additionally, breathability during the pyrolization process of a preform may be inhibited.

BRIEF DESCRIPTION OF THE INVENTION

In an exemplary embodiment, a preform CMC article includes an interior ply structure, an exterior ply shell forming a surface of the preform CMC article, and at least one wicking portion in which the interior ply structure penetrates the exterior ply shell. The interior ply structure includes at least one interior CMC ply, and the at least one interior CMC ply includes at least one longitudinal CMC ply disposed along a length of the preform CMC article. The exterior ply shell includes at least one exterior CMC ply, and substantially surrounds the interior ply structure. The at least one wicking portion includes an exposed edge of the at least one longitudinal CMC ply disposed at the surface of the preform CMC article.

In another exemplary embodiment, a CMC article includes an interior ply structure and an exterior ply shell forming a surface of the CMC article. The interior ply structure includes at least one interior CMC ply, and the at least one interior CMC ply includes at least one longitudinal CMC ply disposed along a length of the CMC article. The exterior ply shell includes at least one exterior CMC ply, and substantially surrounds the interior ply structure. The at least one longitudinal CMC ply penetrates the exterior ply shell and includes an exposed edge disposed at the surface of the CMC article.

In another exemplary embodiment, a method for forming a CMC article includes wicking a melt infiltration agent into a preform CMC article, and forming the CMC article. The preform CMC article includes an interior ply structure, an exterior ply shell forming a surface of the preform CMC article, and at least one wicking portion in which the interior ply structure penetrates the exterior ply shell. The interior ply structure includes at least one interior CMC ply, and the at least one interior CMC ply includes at least one longitudinal CMC ply disposed along a length of the preform CMC article. The exterior ply shell includes at least one exterior CMC ply, and substantially surrounds the interior ply structure. The at least one wicking portion includes an exposed edge of the at least one longitudinal CMC ply disposed at the surface of the preform CMC article. The melt infiltration agent wicks through the at least one wicking portion into the interior ply structure along the at least one longitudinal CMC ply.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are exemplary preform CMC articles, CMC articles, and methods for forming CMC articles. Embodiments of the present disclosure, in comparison to articles and methods not utilizing one or more features disclosed herein, decrease costs, decrease densification time, increase process efficiency, increase durability, increase strength, increase process yield, or a combination thereof.

Figure 1:
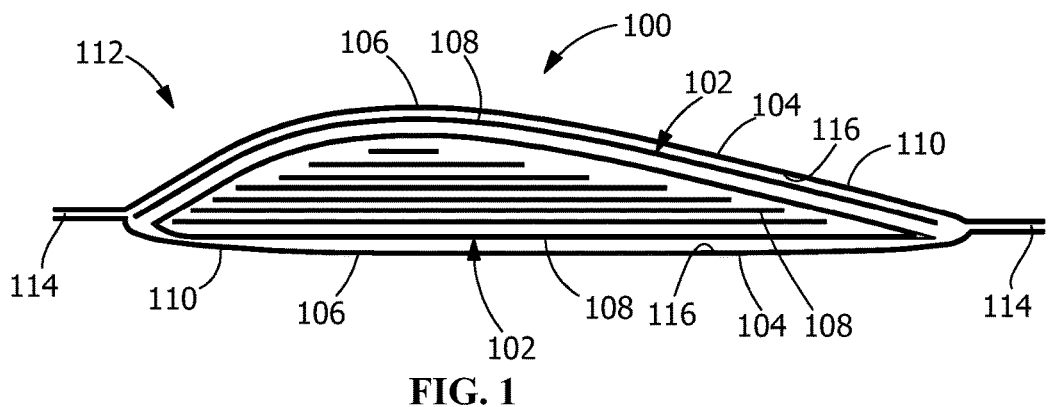
FIG. 1 is a schematic sectional view of a non-inventive preform CMC assembly.

Referring to FIG. 1, in a non-inventive embodiment, a preform CMC assembly 100 includes an interior ply structure 102 and an exterior ply shell 104 forming a surface 106 of the preform CMC assembly 100. The interior ply structure 102 includes at least one interior CMC ply 108, and the exterior ply shell 104 includes at least one exterior CMC ply 110, wherein the exterior ply shell 104 surrounds the interior ply structure 102. The exterior ply shell 104 may include a wicking seam 114. When undergoing densification by melt infiltration, the interior ply structure 102 is accessible through the thickness of the at least one exterior CMC ply 110, except that wherein the exterior ply shell 104 includes the wicking seam 114, the interior ply structure 102 is also accessible through the wicking seam 114 along an interior surface 116 of the exterior ply shell 104.

Figure 2:
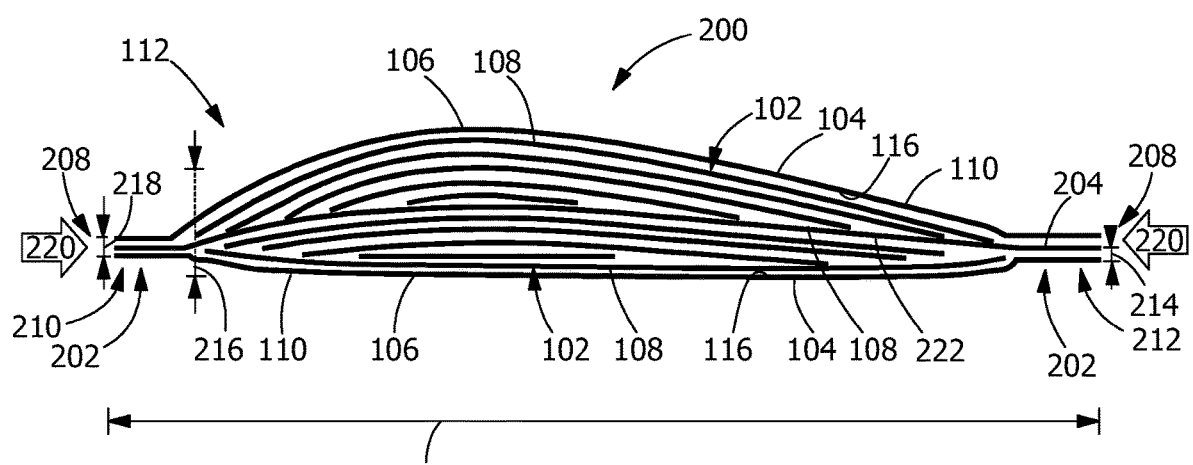
FIG. 2 is a schematic sectional view of a preform CMC article, according to an embodiment of the present disclosure.

Referring to FIG. 2, in one embodiment, a preform CMC article 200 includes an interior ply structure 102, an exterior ply shell 104 forming a surface 106 of the preform CMC article 200, and at least one wicking portion 202 in which the interior ply structure 102 penetrates the exterior ply shell 104. The interior ply structure 102 includes at least one interior CMC ply 108, the at least one interior CMC ply 108 including at least one longitudinal CMC ply 204 disposed along a length 206 of the preform CMC article 200. The exterior ply shell 104 includes at least one exterior CMC ply 110, and the exterior ply shell 104 substantially surrounds the interior ply structure 102 (surrounding the interior ply structure 102 to the same degree as in the preform CMC assembly 100, with the exception of the at least one wicking portion 202). The at least one wicking portion 202 includes an exposed edge 208 of the at least one longitudinal CMC ply 204 disposed at the surface 106 of the preform CMC article 100. In a further embodiment, the at least one wicking portion 202 is at least partially surrounded by the exterior ply shell 104. In yet a further embodiment, along the length 206 of the preform CMC article 200, at least one internal CMC ply 108 terminates prior to at least one of the exposed edges 208.

The preform CMC article 200 may be any suitable article, including but not limited to, a turbine component. In one embodiment, wherein the turbine component is an airfoil 112, the at least one wicking portion 202 includes at least one of a leading edge wicking portion 210 and a trailing edge wicking portion 212. The at least one longitudinal CMC ply 204 may be generally aligned along a mean camber 222 of the airfoil 112.

The at least one interior CMC ply 108 and the at least one exterior CMC ply 110 may include any suitable compositions. In one embodiment, the at least one interior CMC ply 108 and the at least one exterior CMC ply 110 include a CMC composition independently selected from aluminum oxide-fiber-reinforced aluminum oxide (Ox/Ox), carbon-fiber-reinforced carbon (C/C), carbon-fiber-reinforced silicon carbide (C/SiC), silicon-carbide-fiber-reinforced silicon carbide (SiC/SiC), carbon-fiber-reinforced silicon nitride (C/SiN), or combinations thereof.

The exterior ply shell 104 may include any suitable exterior ply shell thickness 214, including but not limited to, an exterior ply shell thickness 214 of at least about 0.075 mm, alternatively at least about 0.1 mm, alternatively at least about 0.5 mm, alternatively at least about 1 mm, alternatively at least about 1.5 mm, alternatively at least about 2 mm, alternatively at least about 3 mm, alternatively at least about 5 mm, alternatively between about 0.075 mm and about 10 mm.

The interior ply structure 102 may include any suitable interior ply structure average thickness 216, including but not limited to, an interior ply structure average thickness 216 of at least about 5 mm, alternatively at least about 10 mm, alternatively at least about 20 mm, alternatively at least about 50 mm, alternatively between about 5 mm and about 200 mm, alternatively between about 10 mm and about 100 mm.

The exposed edge 208 may include any suitable exposed thickness 218 of the at least one longitudinal CMC ply 204, including but not limited to, an exposed thickness 218 of at least about 0.05 mm, alternatively at least about 0.1 mm, alternatively at least about 0.5 mm, alternatively at least about 1 mm, alternatively at least about 2 mm, alternatively at least about 5 mm, alternatively at least about 10 mm, alternatively at least about 25 mm, alternatively at least about 50 mm, alternatively between about 0.05 mm and about 100 mm, alternatively between about 0.05 mm and about 10 mm, alternatively between about 1 mm and about 50 mm, alternatively between about 25 mm and about 100 mm.

Figure 3:
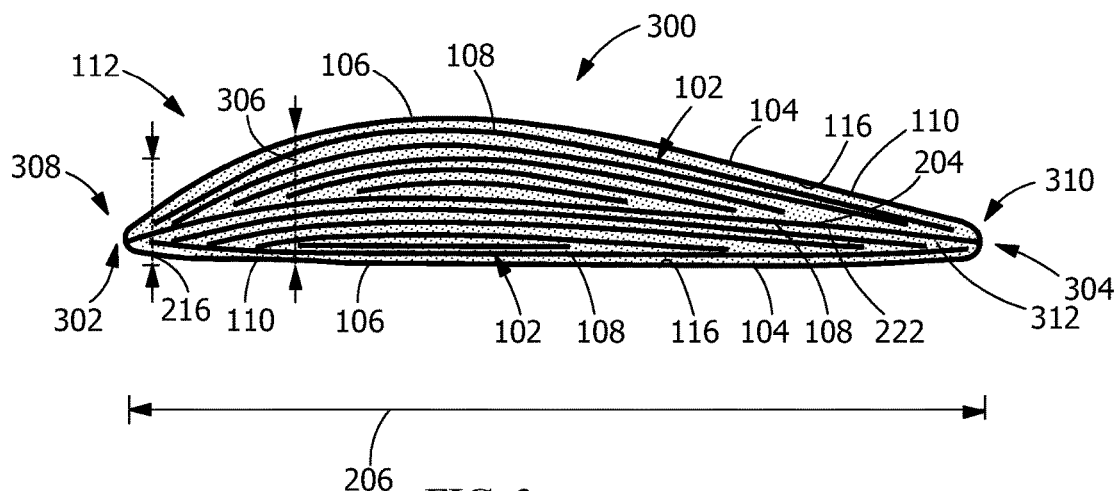
FIG. 3 is a schematic sectional view of a CMC article, according to an embodiment of the present disclosure.

Referring to FIGS. 2 and 3, in one embodiment, a method for forming a CMC article includes wicking a melt infiltration agent 220 into the preform CMC article 200 and forming the CMC article 300, wherein the melt infiltration agent 220 wicks through the at least one wicking portion 202 into the interior ply structure 102 along the at least one longitudinal CMC ply 204.

In one embodiment, the melt infiltration agent 220 is wicked through the at least one wicking portion 202 into the interior ply structure 102 along an interior surface 116 of the exterior ply shell 104 in addition to wicking through the at least one wicking portion 202 into the interior ply structure 102 along the at least one longitudinal CMC ply 204. In a further embodiment, the wicking of the melt infiltration agent 220 into the interior ply structure 102 along the at least one longitudinal CMC ply 204 proceeds at an increased rate relative to the wicking of the melt infiltration agent 220 into the interior ply structure 102 along the interior surface 116 of the exterior ply shell 104.

In one embodiment, melt infiltration time into the interior ply structure 102 of the preform CMC article 200 is reduced in comparison to a comparative method in which the melt infiltration agent 220 wicks along an interior surface 116 of the exterior ply shell 104 into the interior ply structure 102 but does not wick along at least one longitudinal CMC ply 204 into the interior ply structure 102 (e.g., into the preform CMC assembly 100 of FIG. 1). In a further embodiment, the melt infiltration time is reduced by at least about 5%, alternatively at least about 10%, alternatively at least about 15%, alternatively at least about 25%, alternatively at least about 33%, alternatively at least about 50%, alternatively at least about 67%, alternatively at least about 75%, alternatively at least about 80%, alternatively at least about 85%, alternatively at least about 90%.

In one embodiment, the at least one wicking portion 202 is removed following wicking the melt infiltration agent 220 into the preform CMC article 200. The at least one wicking portion 202 may be removed by any suitable technique, including, but not limited to, cutting, machining, grinding, or combinations thereof.

In one embodiment, wherein the preform CMC article 200 is a turbine component, and the turbine component includes an airfoil 112 having at least one of a leading edge wicking portion 210 and a trailing edge wicking portion 212, the melt infiltration agent 220 is wicked into the preform CMC article 200 through the at least one of the leading edge wicking portion 210 and the trailing edge wicking portion 212. In a further embodiment, wherein the airfoil includes both a leading edge wicking portion 210 and a trailing edge wicking portion 212, the melt infiltration agent 220 is wicked into the preform CMC article 200 through both of the leading edge wicking portion 210 and the trailing edge wicking portion 212.

The melt infiltration agent 220 may include any suitable composition, including, but not limited to, a composition including silicon.

Referring to FIG. 3, in one embodiment the CMC article 300 includes an interior ply structure 102, and an exterior ply shell 104 forming a surface 106 of the CMC article 300. The interior ply structure 102 includes at least one interior CMC ply 108 having at least one longitudinal CMC ply 204 disposed along a length 206 of the CMC article 300. The exterior ply shell 104 includes at least one exterior CMC ply 110 and substantially surrounds the interior ply structure 102. The at least one longitudinal CMC ply 204 penetrates the exterior ply shell 104 and includes an exposed edge 208 disposed at the surface 106 of the CMC article 300. In a further embodiment, the exposed edge 208 is flush with the surface 106 of the CMC article 300. The interior ply structure 102 and the exterior ply shell 104 may form a densified CMC structure 312.

In one embodiment, the at least one longitudinal CMC ply 204 extends from a first end 302 of the CMC article 300 to a second end 304 of the CMC article 300, and penetrates the exterior ply shell 104 at the first end 302 and at the second end 304. The CMC article 300 may include a variable thickness 306 normal to the length 206 of the CMC article 300 (shown), or a uniform thickness 306 normal to the length 206 of the CMC article 300 (not shown). In a further embodiment, along the length 206 of the CMC article 300, at least one internal CMC ply 108 terminates prior to the first end 302 and the second end 304.

In one embodiment, wherein the CMC article 300 includes an airfoil 112, the at least one longitudinal CMC ply 204 extends from a first end 302 of the CMC article 300 (being a leading edge 308 of the airfoil 112) to the second end 304 of the CMC article 300 (being a trailing edge 310 of the airfoil 112). The at least one longitudinal CMC ply 204 penetrates the exterior ply shell 104 at the leading edge 308 and at the trailing edge 310, and is generally aligned along a mean camber 222 of the airfoil 112 between the leading edge 308 and the trailing edge 310.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A preform ceramic matrix composite (CMC) article, comprising:
    an interior ply structure, the interior ply structure including at least one interior CMC ply, the at least one interior CMC ply including at least one longitudinal CMC ply disposed along a length of the preform CMC article;
    an exterior ply shell, the exterior ply shell forming a surface of the preform CMC article and including at least one exterior CMC ply, the exterior ply shell substantially surrounding the interior ply structure; and
    at least one wicking portion in which the interior ply structure penetrates the exterior ply shell, the at least one wicking portion including an exposed edge of the at least one longitudinal CMC ply disposed at the surface of the preform CMC article.

2. The preform CMC article of claim 1, wherein the at least one wicking portion is at least partially surrounded by the exterior ply shell.

3. The preform CMC article of claim 1, wherein the preform CMC article is a turbine component.

4. The preform CMC article of claim 3, wherein the turbine component includes an airfoil, and the at least one wicking portion includes at least one of a leading edge wicking portion and a trailing edge wicking portion.

5. The preform CMC article of claim 1, wherein the at least one interior CMC ply and the at least one exterior CMC ply independently include a CMC composition selected from the group consisting of an aluminum oxide-fiber-reinforced aluminum oxide (Ox/Ox), a carbon-fiber-reinforced carbon (C/C), a carbon-fiber-reinforced silicon carbide (C/SiC), a silicon-carbide-fiber-reinforced silicon carbide (SiC/SiC), a carbon-fiber-reinforced silicon nitride (C/SiN), and combinations thereof.

6. The preform CMC article of claim 1, wherein melt infiltration time into the interior ply structure is reduced in comparison to a comparative preform CMC article in which a comparative interior ply structure does not penetrate a comparative exterior ply shell.

7. The preform CMC article of claim 1, wherein:
    the exterior ply shell includes an exterior ply shell thickness of at least about 0.075 mm;
    the interior ply structure includes an interior ply structure average thickness of at least about 5 mm; and
    the exposed edge includes an exposed thickness of at least about 1 mm of the at least one longitudinal CMC ply.

8. The preform CMC article of claim 1, wherein the preform CMC article includes a variable thickness normal to the length of the preform CMC article.

9. The preform CMC article of claim 1, wherein the at least one longitudinal CMC ply extends from a first end of the preform CMC article to a second end of the preform CMC article, and penetrates the exterior ply shell at the first end and at the second end.

10. The preform CMC article of claim 4, wherein the at least one longitudinal CMC ply extends from a leading edge of the airfoil to a trailing edge of the airfoil.

11. The preform CMC article of claim 10, wherein the at least one longitudinal CMC ply penetrates the exterior ply shell at the leading edge and at the trailing edge.

12. The preform CMC article of claim 10, wherein the at least one longitudinal CMC ply is generally aligned along a mean camber of the airfoil between the leading edge and the trailing edge.

13. The preform CMC article of claim 4, wherein the at least one wicking portion includes a leading edge wicking portion and a trailing edge wicking portion.

14. The preform CMC article of claim 1, wherein the at least one wicking portion is arranged and disposed to wick a melt infiltration agent into the preform CMC article.

15. The preform CMC article of claim 14, wherein the at least one wicking portion is arranged and disposed to wick the melt infiltration agent through the at least one wicking portion into the interior ply structure along the at least one longitudinal CMC ply.

16. The preform CMC article of claim 14, wherein the at least one wicking portion is arranged and disposed to reduce melt infiltration time of the melt infiltration agent into the interior ply structure of the preform CMC article in comparison to a comparative preform CMC article which is identical to the preform CMC article except that the comparative preform CMC article does not include the at least one wicking portion.

17. The preform CMC article of claim 16, wherein the melt infiltration time is reduced by at least 10%.

18. The preform CMC article of claim 17, wherein the melt infiltration time is reduced by at least 75%.

19. The preform CMC article of claim 14, wherein the melt infiltration agent includes silicon.

20. The preform CMC article of claim 7, wherein the exposed thickness is at least about 5 mm.

* * * * *